Sept. 12, 1950  J. O. WILSON  2,521,888
MINE DUSTER
Filed March 26, 1948  2 Sheets-Sheet 1
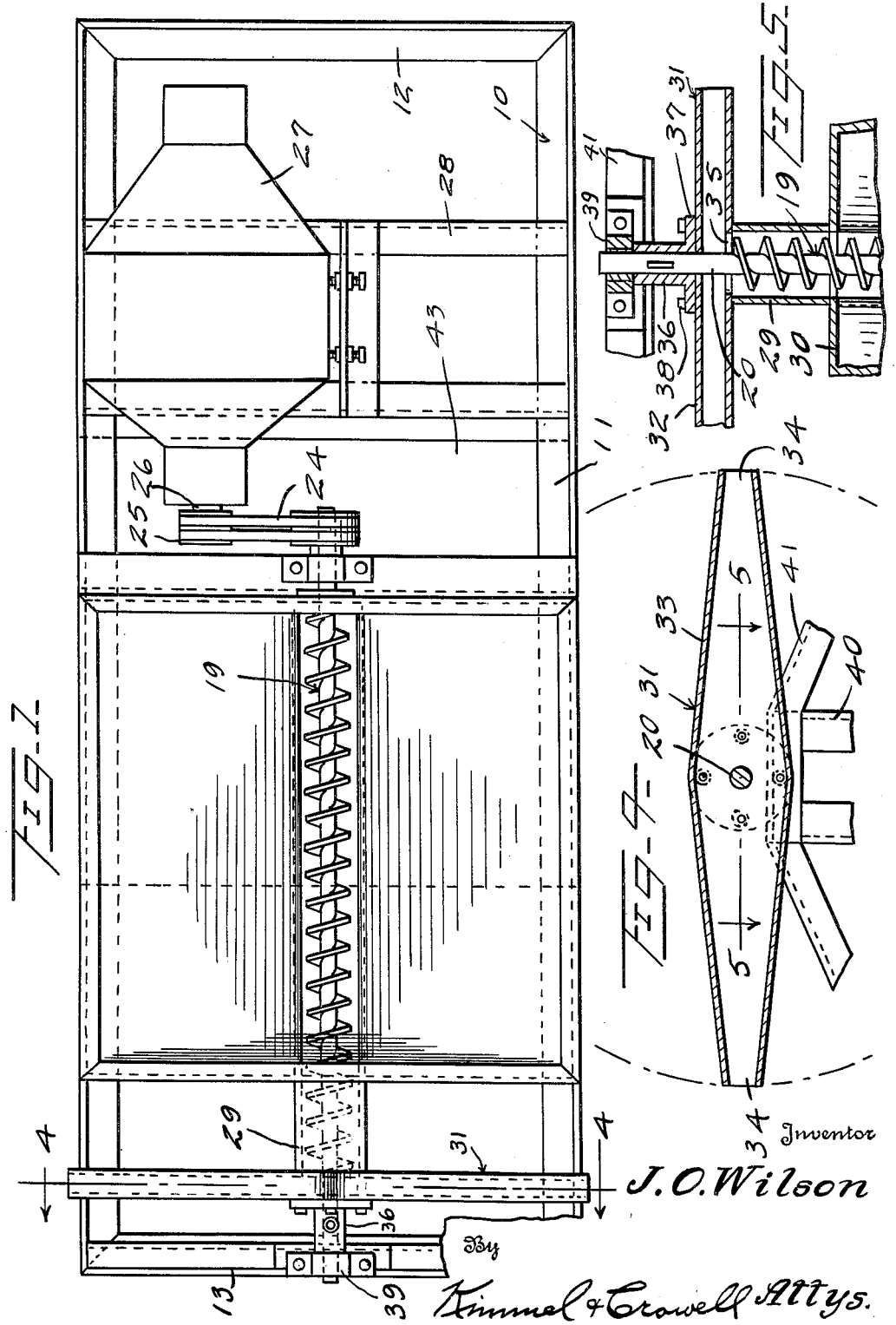
Inventor
J. O. Wilson
By Kimmel & Crowell Attys.

Sept. 12, 1950 J. O. WILSON 2,521,883
MINE DUSTER
Filed March 26, 1948 2 Sheets-Sheet 2
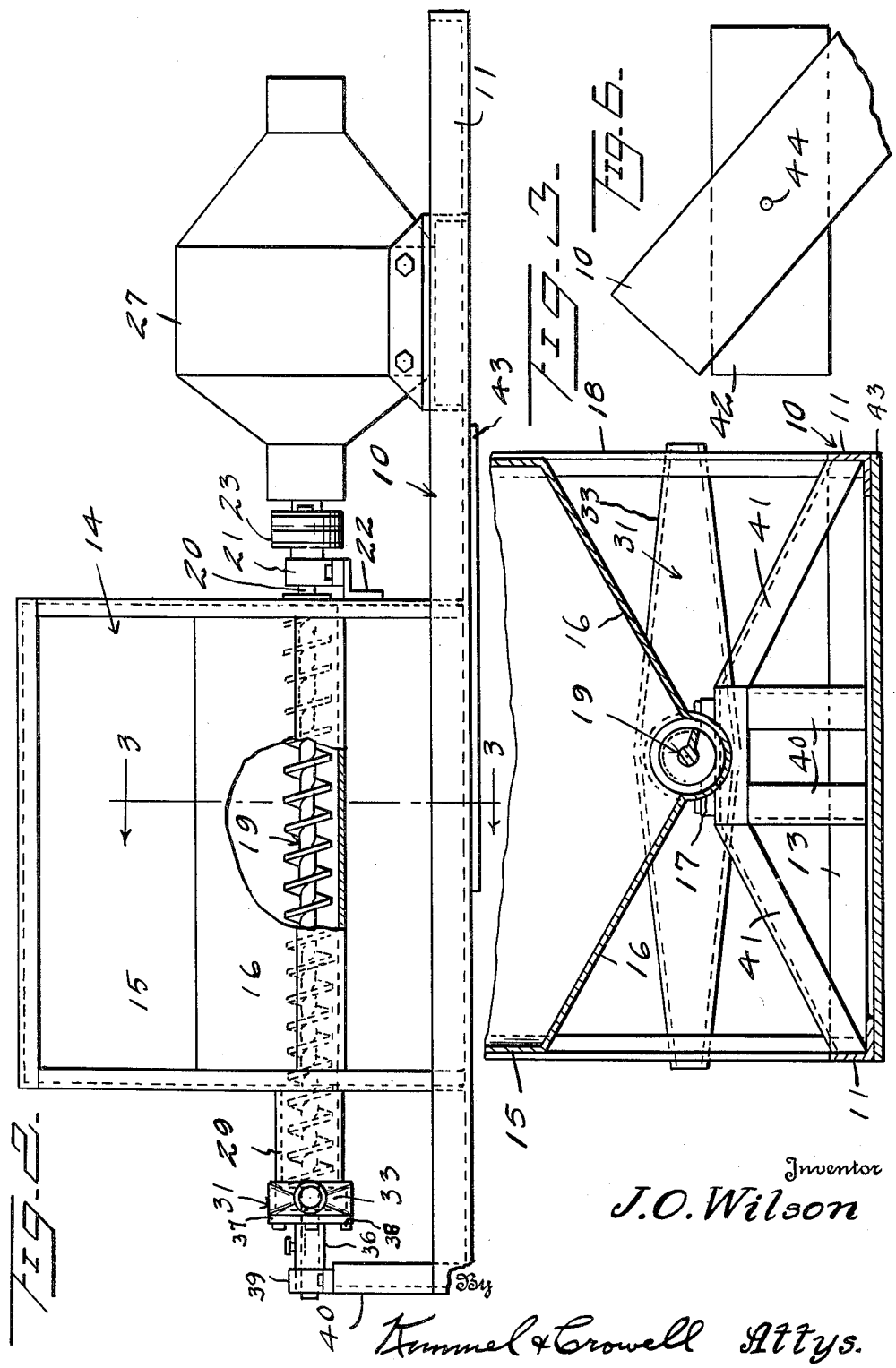
Inventor
J. O. Wilson
By Kimmel & Crowell Attys.

Patented Sept. 12, 1950

2,521,888

UNITED STATES PATENT OFFICE 2,521,888

MINE DUSTER

John O. Wilson, Granite City, Ill.

Application March 26, 1948, Serial No. 17,181

3 Claims. (Cl. 169—2)

1

This invention relates to dusting machine for use in mine tunnels.

An object of this invention is to provide a dusting machine for use in mine tunnels which is designed to broadcast non-combustible dust, such as rock dust or the like, in order to eliminate the hazard of exploding coal dust.

Another object of this invention is to provide a dusting machine which will operate in a confined area such as a tunnel, and will broadcast rock or other non-combustible dust onto the sides, top and bottom of the tunnel for mixture with or covering of coal dust in order to reduce or eliminate the hazard of explosions or fires.

A further object of this invention is to provide a device of this kind which is so constructed that it may be made portable and mounted on a mobile chassis for use in dusting mine tunnels along the length thereof.

With the above and other objects in view, my invention consists in the arrangement, combination and details of construction disclosed in the drawings and specification, and then more particularly pointed out in the appended claims.

In the drawings,

Figure 1 is a plan view, partly broken away, of a mine duster constructed according to an embodiment of this invention, Figure 2 is a detail side elevation, partly broken away and in section, of the device, Figure 3 is a fragmentary sectional view taken on the line 3—3 of Figure 2, Figure 4 is a sectional view taken on the line 4—4 of Figure 1, Figure 5 is a fragmentary sectional view taken substantially on the line 5—5 of Figure 4.

Figure 6 is a diagrammatic view showing the angular adjustment of this device on a mobile carriage.

Referring to the drawings, the numeral 10 designates generally a base which is formed of parallel longitudinal side members 11 and end members 12 and 13. The base 10 has mounted thereon a hopper 14 which is formed of vertical side walls 15 and a V-shaped bottom wall 16, terminating in a longitudinal conveyor trough 17.

The hopper 14 is mounted on upright angle members 18 which are secured at their lower ends to the base 10. A screw conveyor 19 is rotatably mounted in the trough 17 and has the shaft 20 thereof extending through the rear of the hopper 14 and journaled in a bearing 21 carried by a horizontal angle member 22.

A pulley 23 is secured to the shaft 20 and has trained thereabout a pair of belts 24 which are

2 also trained about a driving pulley 25 mounted on a motor shaft 26. The motor shaft 26 is operated from a motor 27 which is mounted on a pair of motor supporting angle bars 28 secured between the side members 11.

The hopper 14 includes a discharge nipple 29, extending from the forward wall 30 thereof, and the conveyor 19 extends into the nipple 29 for discharging the dust into the interior of a hollow, or tubular broadcasting member generally designated as 31. The broadcasting member 31 is formed of parallel side members 32 and outwardly convergent connecting walls 33, which at their outer ends form a reduced nozzle 34. There are two of these nozzles which are diametrically disposed so that as the conveyor 19 rotates, the dust which is forced through an opening 35 into the broadcasting member 31 will be thrown in a vertical plane for contact with the top, bottom and side walls of a tunnel.

The broadcasting member 31 is secured to the shaft 20 by means of a coupling sleeve 36 which is formed with a flange 37 secured by fastening means 38 to the broadcasting member 31. The sleeve 36 may be keyed or otherwise firmly secured to the shaft 20. The extended end of the shaft 20 is journaled in a bearing 39 which is carried by a pair of upright bars 40, extending from the end member 13, and the upright members 40 are braced by means of a pair of downwardly and outwardly divergent angle bars 41.

In the use and operation of this device, the material which is to be broadcast, such as rock dust or the like, is discharged into the hopper 14. The motor 27 will rotate the conveyor 19 so as to move the material from the hopper 14 into the interior of the broadcasting member 31. As the broadcasting member 31 rotates, the material therein will be discharged through the rotating nozzles 34 and in this manner the dust will be discharged onto the top, bottom and opposite side walls of the tunnel or the like so that this non-inflammable dust will mix with the coal dust or will cover the coal dust in order to eliminate any explosion in the tunnel by reason of the coal dust.

The frame 10 may be mounted on a mobile structure such as the chassis of a mine car or the like so that the device may be moved along the length of the tunnel and the tunnel dusted with the non-inflammable dust.

The base frame 10 is adapted to be mounted on a mobile carriage as diagrammatically indicated at 42 in Figure 6. The base frame 10 has a plate 43 secured to the bottom thereof through which a pivot 44 engages. In this manner the device may be swung to any desired angle with respect to the mobile carriage and by swinging the device laterally as shown in Figure 6 the material will be broadcast for a greater distance along the sides of the tunnel than when the base is parallel with the length of the tunnel.

I do not mean to confine myself to the exact details of construction herein disclosed, but claim all variations falling within the purview of the appended claims.

What I claim is:

1. A tunnel dusting machine comprising a frame, a hopper on said frame, a screw conveyor at the bottom of said hopper and having a portion extending through one end of said hopper for discharging material from said one end of said hopper, an operator for said conveyor, a discharge conduit fixed to said hopper engaging about said extending portion of said conveyor, an elongated broadcasting member fixed to said conveyor for rotation therewith, said broadcasting member including an inner wall formed with an opening coaxial and communicating with said conduit whereby the material passing through said conduit will be forced into said broadcasting member for centrifugal discharge from the outer open ends of said broadcasting member.

2. A tunnel dusting machine comprising a frame, a hopper carried by said frame, a screw conveyor at the bottom of said hopper and having one end extending through the front wall of said hopper for discharging material from said front wall of said hopper, an operator for said conveyor, a tubular conduit fixed to said front wall of said hopper and engaging about said extending end of said conveyor, and a broadcasting member mounted on said extending end of said conveyor for rotation therewith and confronting the outer end of said conduit and formed with a communicating opening, said broadcasting member being formed of an elongated hollow body open at the opposite ends thereof, said broadcasting member including a pair of outwardly converging walls forming reduced discharge nozzles whereby the material in said hopper is positively forced through said conduit into said broadcasting member for centrifugal discharge from said nozzles.

3. A tunnel dusting machine comprising a frame, a hopper carried by said frame, a longitudinal gutter formed in the bottom of said hopper, a screw conveyor disposed in said gutter and having one end extending through one end of said hopper, a tubular discharge conduit extending outwardly from said one end of said hopper and disposed about said extending end of said conveyor, an elongated hollow broadcasting member fixed to said extending end of said conveyor for rotation therewith and disposed in confronting relation with the outer end of said conduit, an opening formed in said broadcasting member adapted to communicate the interior thereof with said discharge conduit, the opposite ends of said broadcasting member being constricted to provide discharge nozzles whereby the material in said hopper will be positively forced into said broadcasting member for centrifugal discharge therefrom.

JOHN O. WILSON.

REFERENCES CITED

The following references are of record in the file of this patent:

UNITED STATES PATENTS

| Number | Name | Date |
| --- | --- | --- |
| 18,083 | Cahoon | Sept. 1, 1857 |
| 1,011,071 | Mehlberger | Dec. 5, 1911 |
| 1,019,609 | Derdeyn | Mar. 5, 1912 |
| 1,613,988 | Flack | Jan. 11, 1927 |
| 1,616,303 | Campbell | Feb. 1, 1927 |
| 2,159,670 | Neitzke | May 23, 1939 |
| 2,200,165 | Fulkerson et al. | May 7, 1940 |

FOREIGN PATENTS

| Number | Country | Date |
| --- | --- | --- |
| 345,992 | Great Britain | Mar. 27, 1931 |